United States Patent [19]

Fuderer

[11] Patent Number: 4,959,088
[45] Date of Patent: Sep. 25, 1990

[54] METHOD OF PRODUCING NITRIC ACID AND REFRIGERATION

[76] Inventor: Andrija Fuderer, Residencial Mediterrani 2, 17210 Calella de Palafrugell, Spain

[21] Appl. No.: 339,238

[22] Filed: Apr. 14, 1989

[51] Int. Cl.[5] ............................................. F25J 1/02
[52] U.S. Cl. ............................................. 62/23; 62/40
[58] Field of Search ................................... 62/23, 40

[56] References Cited

U.S. PATENT DOCUMENTS

| | | | |
|---|---|---|---|
| 3,101,262 | 8/1963 | Rottmayr | 62/23 |
| 3,257,812 | 6/1966 | Shaievitz | 62/23 |
| 3,312,075 | 4/1967 | Becker | 62/23 |
| 3,327,487 | 6/1967 | Karwat | 62/23 |
| 3,349,569 | 10/1967 | Nebgen | 62/17 |
| 3,543,529 | 12/1970 | Knapp et al. | 62/23 |
| 3,553,972 | 1/1971 | Markbreiter et al. | 62/18 |
| 3,620,031 | 11/1972 | Tennyson | 62/17 |
| 3,872,025 | 3/1975 | Singleton | 62/28 |
| 3,985,529 | 10/1976 | Petersson | 62/23 |
| 4,380,461 | 4/1983 | Haslam et al. | 62/11 |

*Primary Examiner*—Ronald C. Capossela
*Attorney, Agent, or Firm*—Michael J. Striker

[57] ABSTRACT

A method of and an apparatus for producing an air-ammonia mixture for use in production of nitric acid and for producing refrigeration wherein liquid ammonia is evaporated in a heat exchanger to obtain ammonia vapor and accompanying refrigeration, the ammonia vapor is absorbed by a lean ammonia solution to obtain a rich ammonia solution, ammonia from the rich ammonia solution is stripped with air whereby an air-ammonia mixture, a lean ammonia solution, and additional refrigeration is obtained, and the lean ammonia solution obtained as a result of stripping ammonia from the rich ammonia solution with air is used for absorbing further ammonia vapor for producing a further rich ammonia solution.

19 Claims, 2 Drawing Sheets

METHOD OF PRODUCING NITRIC ACID AND REFRIGERATION

BACKGROUND OF THE INVENTION

A nitric acid is produced by catalytic oxidation or ammonia with air. The air is compressed to between 4 and 14 Bar, is mixed with ammonia vapors, and is passed to a catalytic reactor. If the operating pressure is lower than 6 Bar, it is possible to evaporate the liquid ammonia for refrigeration purposes. However, at a low pressure, the rates of reactions of nitric oxides conversion and absorption are low. Therefore, the reactor effluent gas is cooled and is further compressed to a higher pressure. When the catalytic oxidation is done at pressures around 10 Bar, the ammonia vapors are obtained by heating liquid ammonia with water or low pressure steam, and no refrigeration is produced at all.

Nitric acid plants are frequently located next to ammonia synthesis plants which need large amounts of refrigeration. For example, in a 1,000 tons a day ammonia plant, the power needed for a refrigeration compressor is between 1,500 and 4,000 kW. At an early stage of ammonia synthesis technology, the ammonia was recovered from the synthesis loop by absorption in water or a lean ammonia solution. The thus obtained ammonia solution could be used in the nitric acid production process. However, this process was abandoned because the synthesis loop after the absorption contained water which was undesirable in the synthesis. If air would be used to strip ammonia from the solution, there would be another problem, namely, some carbon dioxide from the air would remain in the water solution. In the ammonia synthesis, carbon dioxide is even less desirable than water.

A closed loop absorption refrigeration generally includes the steps of:

(a) evaporating liquid ammonia;

(b) absorbing an ammonia vapor in a lean solution to obtain a rich solution. The heat of absorption is transferred to a cooling water;

(c) pumping rich solution to a higher pressure, the ammonia being stripped from the solution in a distillation column and reboiler to obtain a lean solution;

(d) condensing the overhead ammonia vapor and recycling the liquid ammonia to the step (a), while the lean solution is recycled to the step (b).

The reboiler in step (c) is operated at temperatures around 160° C. and a substantial amount of heat is needed to drive out the ammonia from the solution. For each kilogramm of evaporated ammonia about 1,000 Joules of refrigeration is obtained in step (a) and about 1,500 Joules of heat is needed in step (c). The process is clearly highly uneconomical, when compared to the process of the invention.

SUMMARY OF THE INVENTION

According to the invention, there is provided a refrigeration process with a special half-open absorption refrigeration cycle associated with producing air-ammonia mixture for producing nitric acid. The half-open refrigeration cycle according to the invention is characterized by four steps from which step (a) and step (b) are the same as in the above described conventional closed loop absorption refrigeration cycle. However, the other steps are different. In step (c) ammonia is stripped from the rich solution by air. This stripping is done at low temperature preferably between +50° C. and −20° C. Instead of requiring heat at around 160° C, the heat is needed at around 0° C. that means that additional refrigeration is produced. As a result of stripping, a mixture of air and ammonia vapor and a lean ammonia solution are obtained. The mixture of air and ammonia vapor is not recycled: instead it is sent to the catalytic reactor of the nitric acid plant. In this respect it is an open cycle: ammonia is continuously fed to the cycle and ammonia vapors mixed with air continuously leave the cycle.

In step (d) the lean solution is recycled from step (c) to step (a) essentially in a closed loop.

The total amount of refrigeration which is produced, exceeds about twice the heat of evaporation of ammonia, thus being equal to about 2,000 Joules/kg of ammonia. Three processes are compared in the following Table 1: The conventional absorption refrigeration, the conventional nitric acid process and the process of the invention.

TABLE 1

|  | Closed Loop Absorption Refrigeration | Conventional Nitric Acid | | Process of Invention | |
| --- | --- | --- | --- | --- | --- |
|  |  | 4 Bar | 10 Bar | 4 Bar | 10 Bar |
| Refrigeration J/kgNH$_3$ | 1000 | 1000 | — | 2000 | 2000 |
| Heat consumed J/kgNH$_3$ | 1500 | — | (1000) | — | — |
| Refrigeration temp. °C. | −20 | −1 | (+30) | −33 | −20 |
| Heating temperature °C. | +160 | −1 | +30 | (0) | (+5) |

Table 1 clearly illustrates the advantages of the process according to the invention: In comparison with low pressure nitric acid process, twice as much refrigeration is obtained and the additional refrigeration is produced at a much lower temperature. In comparison with the high pressure nitric acid plant and the closed loop absorption refrigeration, the superiority is even greater. The process of the invention needs no heat at all and produces much more refrigeration.

However, there is a problem: Air contains 0.03–0.04 mol % of carbon dioxide ($CO_2$). When air is used to strip ammonia from the solution at low temperature, $CO_2$ is strongly absorbed forming ammonium carbonates which would accumulate in the circulated solution. Eventually solid ammonium carbonate would be deposited in the colder part of the stripping column causing operating problems such as flooding.

To prevent the accumulation of carbonates in the solution, one portion of the solution is heated to a higher temperature, and carbon dioxide as well as most of the ammonia are expelled or stripped from this portion of solution, which is subsequently returned to the mainstream of the lean solution. The carbon dioxide can be absorbed in a portion of the rich solution.

In the preferred embodiment the carbon dioxide from the air is absorbed in a small portion of the lean solution and it is stripped again at an elevated temperature. In this way, the air which enters a main stripping column contains essentially no carbon dioxide. It was found that a very small flow of the lean solution is sufficient to absorb the carbon dioxide. The heat which is required to expel the ammonia and the carbon dioxide from this solution is negligible, and additional equipment costs are low. This efficient and low cost removal of the carbon dioxide is another important characteristic of the process.

DESCRIPTION OF THE PREFERRED EMBODIMENTS

Figure 1:
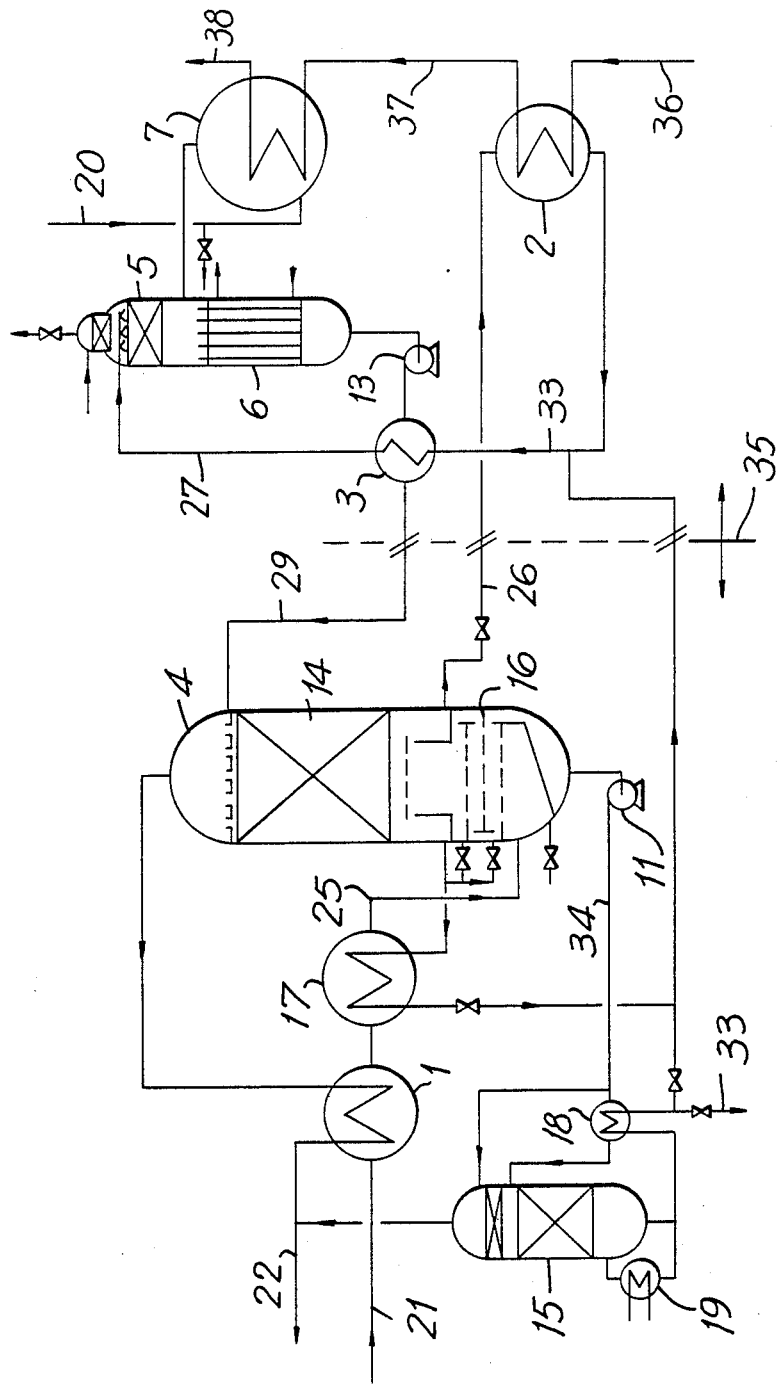
FIG. 1 shows a flow diagram of a first embodiment of a process of producing an air-ammonia mixture and refrigeration according to the present invention.

As shown in FIG. 1, compressed air flowing in line 21 is cooled in heat exchangers 1 and 17 and it is passed to the lower part of the stripping column 4. A small portion of the lean solution is passed to the carbon dioxide absorption section of the stripping column with valve or bubble-cup trays 16. Reverse flow trays may be preferred because the liquid load is very low. Typically, the temperature on these trays is around 5° C., the solution on the upper tray contains around 20% and on the lowest tray 6% ammonia. Under these conditions, the values of the equilibrium carbon dioxide partial pressure and the equilibrium constant $k = y/x$ of the carbon dioxide are very low. For example, the vapor pressure of carbon dioxide is between 0.1 and 1 Torr, and the equilibrium constant at the total pressure of 4 Bar is around 0.0001. Therefore with only 3–4 trays, the concentration of the carbon dioxide can be reduced to levels below 1 ppm. For each mol of air, 0.03 moles of liquid will be more than sufficient to absorb the carbon dioxide. To avoid the stripping of ammonia below 5% on the lowest tray, a small amount of solution may be added to the air flowing in line 25 to the stripping column.

After passing the trays 16 in the lower part of the stripping column 4, the air free of carbon dioxide is passed to the main stripping section with packing 14 containing rich ammonia solution. In this part, the liquid load is high, and the air is gradually enriched in ammonia and leaves the top of the stripping column 4 with around 10 mol % ammonia. It can be further warmed in the heat exchanger 1 and, finally, it is passed through line 22 to a catalytic oxidation reactor of a nitric acid plant. Instead of the air/gas heat exchanger 1, the air can be also cooled in a simple water cooler or a direct water wash type cooler.

The ammonia/carbon dioxide solution is sent by pump through a heat exchanger 18 to a warm stripping column 15 heated by a reboiler 19. Instead of providing the reboiler 19, steam can be introduced directly into the lower part of the warm stripping column 15. This stripping column is small; even for large plants, its diameter is less than 300 mm and the amount of required steam is also small. Alternatively to steam, about 2% of the compressed warm air flowing in line 21, can also be used for stripping. The warm overhead gas from the warm stripping column or vapor is added to the main-stream air-ammonia mixture flowing in line 22. The liquid on the bottom of the stripping column 15 is essentially water. Some of this water may be drained through line 33.

The rich solution flowing in line 29 is delivered to the top of the packing 14 and, as it flows downward, some ammonia is stripped by the incoming air, and the solution temperature drops. The cold lean solution leaving the stripping column 4 is splitted in three streams. The largest portion flows in line 26 under flow and/or level control, a smaller portion is passed to the heat exchanger 17 under temperature control, and the smallest portion, for example 3% of the total lean solution flow, is left on the trays 16. After passing the heat exchangers 17 and 2, the lean solution streams are blended in line 33, and the total flow of the lean solution is warmed in a lean/rich solution heat exchanger 3. The lean solution is passed in line 27 to the top of a packing 5 in the absorber 6. The packing then rapidly absorbs a portion of the ammonia vapor arriving from an evaporator 7. As a consequence, the temperature of the solution increases, and a small amount of dissolved gases are stripped from the solution, washed and vented. Further absorption of ammonia vapor occurs in the cooled part of the absorber 6, and the rich solution is pumped by pump 13 through the heat exchanger 3 and the line 29 back to the stripping column 4. Liquid ammonia passes through a line 20 to the evaporator 7 in which it evaporates producing refrigeration. The refrigeration available in the heat exchanger 2 and the evaporator 7 can be conveniently used for cooling ammonia synthesis loop gas flowing in lines 36, 37 and 38. It also can be used to precool air or synthesis gas before compression so that the compression power is reduced. The dotted line 35 in FIG. 1 symbolically represents the fence between the ammonia plant on the right hand side and the nitric acid plant on the left hand side. No pump is needed to return the lean solution from the nitric acid plant, since the pressure in the stripping column is generally higher than in the absorber.

In conventional nitric acid plants the ammonia vapor is admixed directly to the air. No matter how this admixing is done, at least in some parts of the mixing volume, there will be ammonia concentrations in the air in the range between 0% and 100%, thus also in the explosive range. Any failure of the flow ratio controller could immediately result in reaching an explosive range ammonia concentration in the main gas flow. Such cannot occur when the ammonia is stripped from the solution by air. Air is gradually enriched from 0% to the desired 10% for example, and an explosive range ammonia concentration is nowhere possible. The rich solution concentration can be selected so, that the ammonia vapor pressure above the solution is limited to less than 13% of the air pressure. Even if the air flow drops to zero, the ammonia concentration in the vapor phase cannot exceed 13%.

It may happen, that the nitric acid plant is shut down for maintenance, while the ammonia synthesis continues. For such a case, the conventional plant must provide large storage tanks for liquid ammonia. The storage of ammonia can be done either at atmospheric pressure and $-33°$ C., or at higher temperature but under pressure. In the first case, an expensive additional system must be provided. In the second case, the large storage vessels must be designed to withstand the internal pressure. In a 1,000 tons per day ammonia plant large storage vessels are needed even for one day's production and, in case of failure of such vessel, an environmental catastrophy follows. According to the method of the present invention, a lean solution or water is pumped in line 29 to the absorber 6. If the nitric acid plant is shut down, the rich solution with 25–30% ammonia can be sent to the storage vessels. These are larger, but they are at ambient temperature and pressure or only at a very low overpressure. They are inherently safer, and no refrigeration is needed to maintain the temperature.

The control of the air-ammonia ratio is done by a simple control of the air-rich solution flow ratio. The exact ammonia concentration in the air depends further on the inlet temperature of the rich solution and its composition. These values have only small variations. A constant rich solution temperature at the inlet of the stripping column 4 can be maintained providing liquid bypasses from the line 26 to the line 33 and bypassing the heat exchanger 3 with either of the streams. If the refrigeration duty drops below a predetermined amount, less ammonia will be evaporated in the evaporator 7, and some liquid ammonia may be passed from the line 20 directly to the absorber 6. In this way, the total ammonia flow to the absorber can be simply maintained constant at any refrigeration duty, and the concentration of the rich solution will be also essentially constant. If the ammonia plant is shut down, all liquid ammonia can be directed from a storage to the absorber, or rich solution must be taken from the storage vessel. Water can be added to the system in the line 27 or any other place, and water can be drained from the system through line 33.

Figure 2:
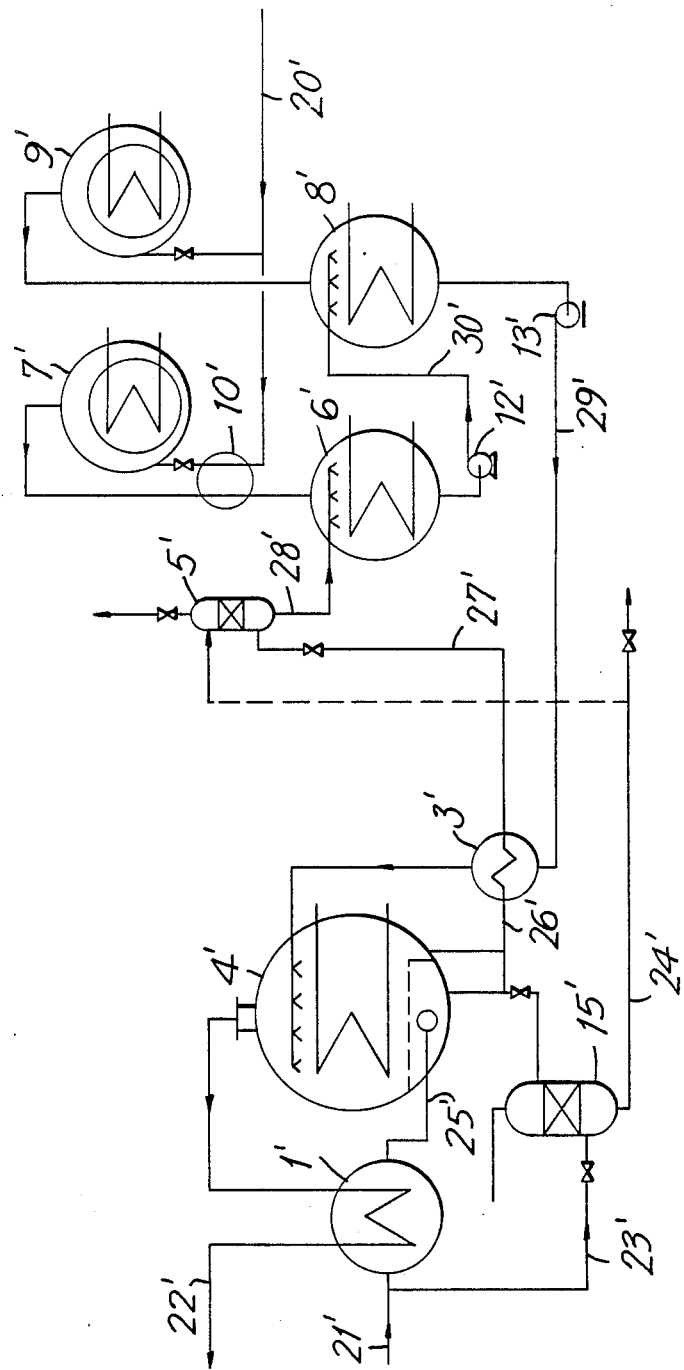
FIG. 2 shows a flow diagram of a second embodiment of a process of producing an air-ammonia mixture and refrigeration according to the present invention.

Another embodiment of the process is shown in FIG. 2. Air flows through line 21', heat exchanger 1', and line 25' to the stripping column 4', and the produced air-ammonia mixture flows through line 22'. Rich solution is passed by pump 13' in line 29' to the heat exchanger 3' and the stripping column 4'. The lean solution which flows in the line 26', is warmed in the heat exchanger 3' and flashed in the separator 5', then it passes to a low pressure absorber 6'. Ammonia vapor is passed from a low pressure evaporator 7' to the absorber 6'. The partly enriched solution is pumped by pump 12' to a high pressure absorber 8' in which the ammonia vapor, arriving from the high pressure evaporator 20', directly to the evaporator 9' and through an optional heat exchanger 10' to the evaporator 7'. A portion of the lean solution is sent to the warm stripping column 15' in which the ammonia and the carbon dioxide are stripped by warm air flowing in the line 23'. The overhead gas from the stripping column 15' is added to the mainstream gas flowing in line 22'. Refrigeration is obtained in the evaporators 7' and 9' and in coils of the stripping column 4'. In the process according to FIG. 2, the ammonia stripping is non-adiabatic and the desorption heat is taken mainly from the medium flowing in the tubes or coils onto which the rich solution is sprayed. The advantage of such a system consists in a much smaller circulation flow of the rich and lean solutions, and the heat exchanger 3 can become much smaller. The larger difference between lean and rich solution ammonia concentrations makes the application of a two-stage evaporation-absorption system advantageous. Another advantage of the process of FIG. 2 is that more refrigeration can be obtained than in the process of FIG. 1. On the other hand, the advantage of the process in FIG. 1 is that a simpler and more conventional design of the stripping column 4 can be applied.

EXAMPLE 1 (See FIG. 1).

6,900 kgmol/hour air compressed to 4.1 Bar flows in the line 21. In the heat exchanger 1, the air is cooled to 35°10 C. and in the heat exchanger 17 with finned tubes, the air is further cooled to +7° C. The cooled air passes through the line 25 to the lower part of the stripping column 4. Four ton/h of lean solution containing 19% ammonia are passed to the valve traps 16. On the trays 16, the carbon dioxide is absorbed in the solution and the air leaving the top tray contains only traces of the carbon dioxide (0.2 ppm). There are four valve trays. The solution at the bottom contains 3% by weight of carbon dioxide and 6% by weight of ammonia. It is pumped to the heat exchanger 18, in which it is warmed to 126° C. A portion of the cold solution is bypassing the heat exchanger 18 and passes directly to the top of the stripping column 15. The reboiler 19 is heated with 0.6 tons/h steam at a pressure of 6 Bar. Alternatively, the reboiler can be eliminated and direct steam at 4 Bar can be passed into the stripping column 15. The hot water from the bottom of the stripping column 15 is cooled in the heat exchanger 18 to 15° C. and added to the lean solution or drained through the line 33. 48 tone/hour of lean solution are warmed in the heat exchanger 17 from −6° C. to 20° C. 105 tons/h of lean solution is passed in the line 26 to the heat exchanger 2 in which it is warmed from −6 to 17° C. The refrigeration duty of the exchanger 2 is 11.3 Million Joule/h (10.7 Million BUT/h). The total flow of lean solution in the line 33 is 156 tons/h. The ammonia concentrations are: in the rich solution 25.2% by weight and in the lean solution 19% by weight. The lean solution is warmed in the heat exchanger 3 to 28° C. and it is passed to the absorber 6. On the packing 5, the lean solution absorbs ammonia vapor and it is warmed to 48° C. 0.6 kmol/hour air which was dissolved in the lean solution is vented at the top of the absorber. 13 tons/h of liquid ammonia is passed in line 20 to the evaporator 7. The ammonia evaporates at 1.2 Bar and −30° C., and a refrigeration of 14.7 million Joule/h is obtained. The ammonia vapor from the evaporator 7 may be first used to precool the liquid ammonia flowing in line 20, or it may be passed directly to the absorber 6. The absorber is cooled with 520 kg/h cooling water. The rich solution temperature at the bottom of absorber is 41° C. 169 tons/h rich solution are pumped to the heat exchanger 3, cooled to 30° C. and passed to the stripping column 4. The power of the pump 13 is 35 kW. In the stripping solution column 4, ammonia is stripped from the solution and the temperature drops. The lean solution is taken out from the stripping columns at −6° C. The air-ammonia mixture leaves the top of the stripping column at 4 Bar, 25° C. and it contains 10 mol % ammonia. In this example, a total refrigeration of 26 Million Joule/h is obtained. This refrigeration is sufficient to cover the needs of a 1,000 tons/day ammonia plant. There is no need for a refrigeration compressor. Along the refrigeration compressor and its drive cost more than all the process equipment shown on FIG. 1. In addition, power needed for driving the compressor is saved. However, the biggest advantage of the process of the invention is that most of the refrigeration is available at low temperature, in this example at −30° C. This means, that the synthesis loop pressure can be selected much lower than 200 Bar, for example at 140 Bar. This lower synthesis pressure means very large additional savings in capital cost and compression power. For a 1,000 ton/day plant, the saving on syngas compression power is 2,200 kW.

In comparison, the conventional nitric acid plant operating at 4 Bar would produce only half as much refrigeration and all of it at 0° C., and when operated at 10 Bar, it would not produce any refrigeration at all.

EXAMPLE 2(FIG. 1).

All flow rates are practically the same as in the Example 1. However, the air pressure in the line 21 is now 10.2 Bar instead of 4.1 Bar. Because of the higher operating pressure, higher solution concentrations are used. The rich solution contains 35% ammonia, and the lean solution contains 30% ammonia. The same refrigeration is obtained in the heat exchanger 2. However, the refrigeration in the evaporator 7 is obtained at 2 Bar and −19° C. (instead of at −30° C). Approximately the same total amount of refrigeration is obtained as in Example 1. In comparison, the conventional nitric acid plant operating the catalytic oxidation at 10 Bar would not produce any refrigeration: evaporating ammonia at +25+ C. requires heat, but it can be hardly considered as refrigeration.

While the invention has been illustrated and described with reference to the specific embodiments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of producing nitric acid and refrigeration, said method comprising the steps of:
    evaporating liquid ammonia to obtain ammonia vapor whereby refrigeration is produced;
    absorbing the ammonia vapor by a lean ammonia solution to obtain a rich ammonia solution;
    stripping ammonia from the rich ammonia solution with air whereby an air-ammonia mixture, a lean ammonia solution, and additional refrigeration are produced; and
    using a portion of the lean ammonia solution produced as a result of stripping the rich ammonia solution with air for absorbing further ammonia vapor obtained as a result of evaporation of further liquid ammonia, to obtain a further rich ammonia solution for producing a further air-ammonia mixture.

2. A method according to claim 1, wherein said step of stripping ammonia from the rich ammonia solution with air includes stripping ammonia at temperatures between +48° C. and −30° C.

3. A method according to claim 2, further including the step of using the refrigeration obtained as a result of evaporating liquid ammonia for cooling an ammonia synthesis loop gas.

4. A method according to claim 2, further including the step of using the refrigeration obtained as a result of stripping ammonia from the rich ammonia solution with air for cooling an ammonia synthesis loop gas.

5. A method according to claim 2, comprising the step of using the refrigeration obtained as a result of evaporating liquid ammonia and the refrigeration obtained as a result of stripping ammonia from the rich ammonia solution with air for cooling an ammonia synthesis loop gas.

6. A method according to claim 2, further comprising the step of communicating the air-ammonia mixture to catalytic oxidation means of a nitric acid producing plant.

7. A method according to claim 2, further comprising the step of storing the rich ammonia solution in a vessel.

8. A method according to claim 2, further comprising the step of storing the lean ammonia solution in a vessel.

9. A method according to claim 2, further comprising the step of storing the rich and lean ammonia solutions in respective vessels.

10. A method according to claim 2, comprising the step of removing carbon dioxide from the air with which ammonia is stripped from the rich ammonia solution by passing the air through an ammonia solution whereby an ammonia-carbon dioxide solution is obtained.

11. A method according to claim 10, comprising the step of stripping ammonia and carbon dioxide from the ammonia-carbon dioxide solution at an elevated temperature.

12. A method according to claim 10, wherein said step of removing carbon dioxide includes absorption of the carbon dioxide by the lean solution at a temperature below 20° C.

13. A method according to claim 11, wherein said step of stripping ammonia and carbon dioxide includes stripping the ammonia and the carbon dioxide with warm air at temperatures above 60° C.

14. A method according to claim 11, wherein said step of stripping ammonia and carbon dioxide includes stripping the ammonia and the carbon dioxide with one of steam and steam and warm air at temperatures above 100° C.

15. A method according to claim 11, comprising the step of blending the air mixture obtained as a result of stripping ammonia and carbon dioxide with the air mixture obtained as a result of stripping ammonia from the rich ammonia solution with air.

16. An apparatus for producing nitric acid and refrigeration, said apparatus comprising an evaporator for evaporating liquid ammonia to obtain ammonia vapor and for producing refrigeration as a result of evaporation of liquid ammonia; absorbing means communicating with said heat exchanger and in which the ammonia vapor is absorbed by a lean ammonia solution to obtain a rich ammonia solution; a stripping column communicating with said absorbing means and in which ammonia is stripped from the rich ammonia solution with air whereby an air-ammonia mixture, a lean ammonia solution and additional refrigeration are produced; and conduit means for communicating the lean ammonia solution produced as a result of striping ammonia from the rich ammonia solution with air to said absorbing means for absorbing further ammonia vapor obtained as a result of evaporation of further liquid ammonia in said evaporator, to obtain a further rich ammonia solution.

17. An apparatus according to claim 16, further comprising conduit means for communicating the air-ammonia mixture to catalytic oxidation means of a nitric acid plant.

18. An apparatus according to claim 16, wherein said stripping column has a lower portion and tray means located in said lower portion and containing a lean ammonia solution for removing carbon dioxide from the air flowing through said stripping column and with which ammonia is stripped from the rich ammonia solution.

19. An apparatus according to claim 17, further comprising a warm stripping column communicating with said lower part of said stripping column for stripping ammonia and carbon dioxide from an ammonia-carbon dioxide solution received from said stripping column.

* * * * *